Oct. 9, 1951  A. A. GABRIELSON  2,570,541
GRASS DISTRIBUTING DEVICE FOR LAWN MOWERS
Filed June 22, 1949  2 Sheets-Sheet 1
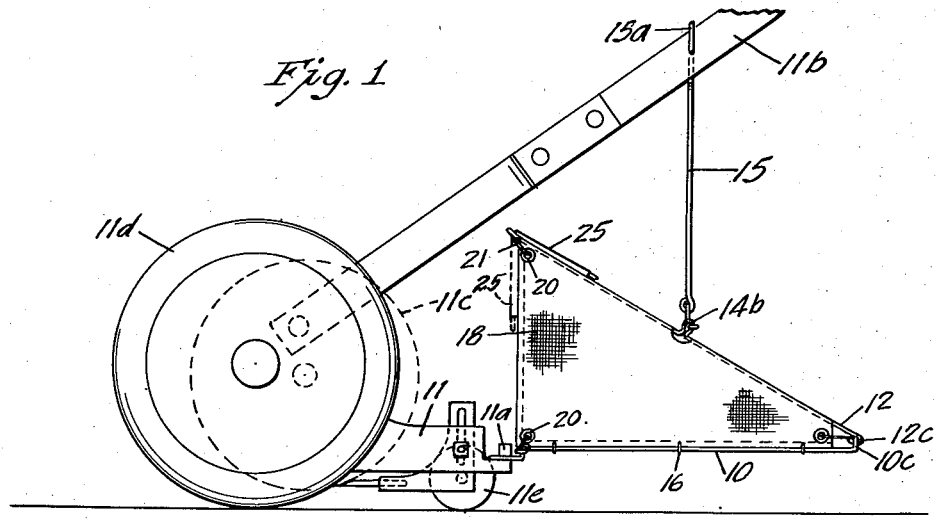
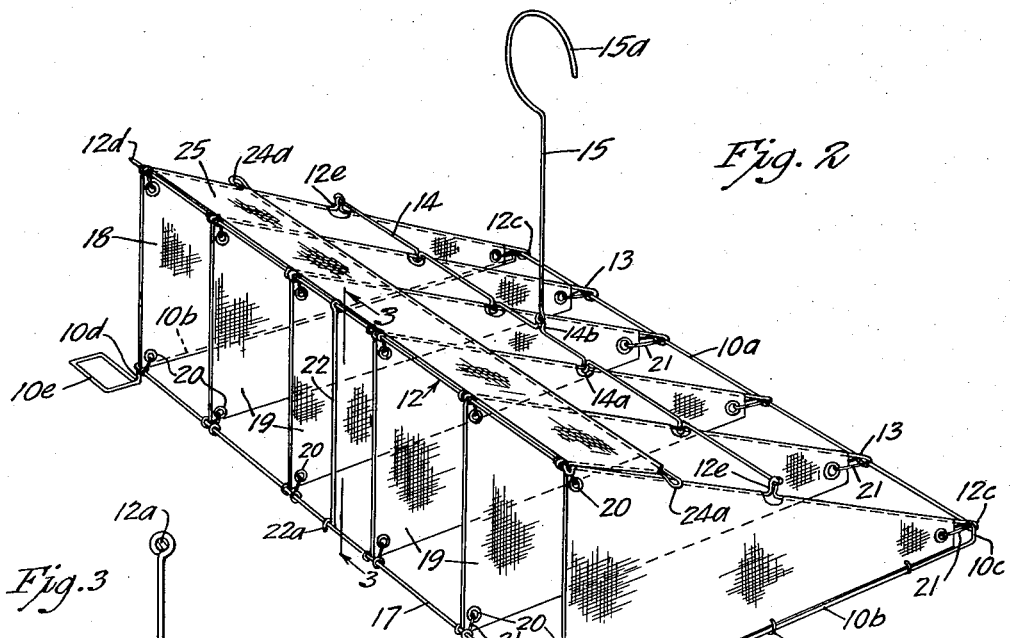
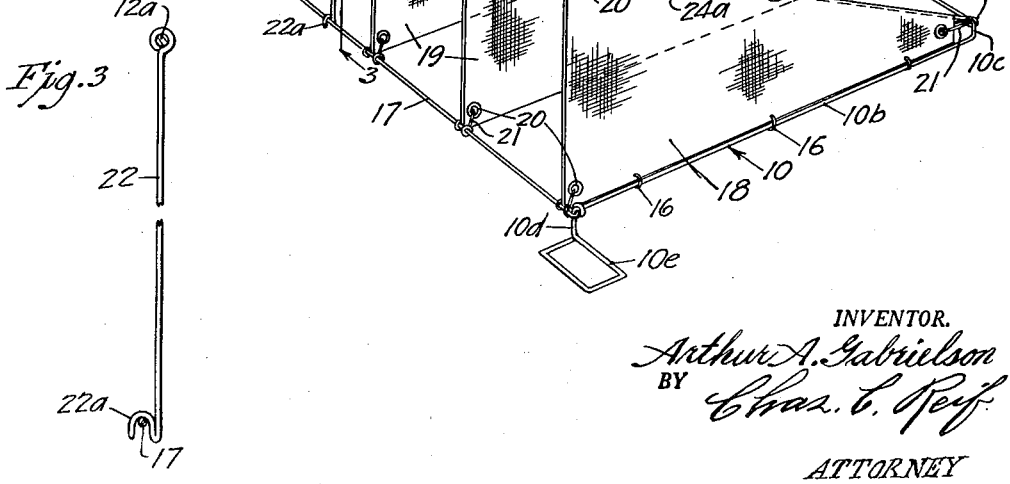
INVENTOR.
Arthur A. Gabrielson
BY Chas. C. Reif
ATTORNEY

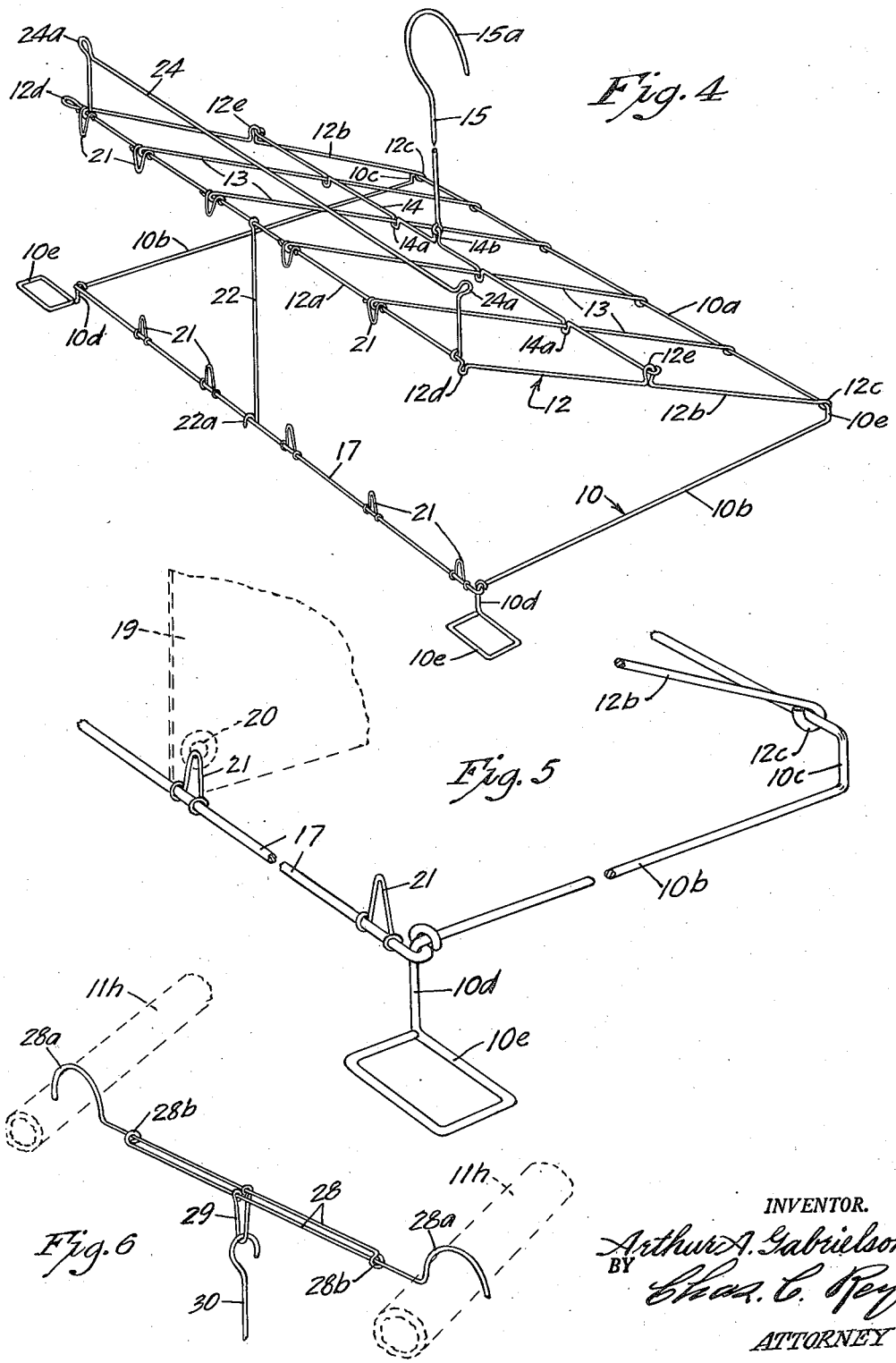

Patented Oct. 9, 1951

2,570,541

UNITED STATES PATENT OFFICE 2,570,541

GRASS DISTRIBUTING DEVICE FOR LAWN MOWERS

Arthur A. Gabrielson, Minneapolis, Minn.

Application June 22, 1949, Serial No. 100,625

15 Claims. (Cl. 56—199)

1

This invention relates to a device to be used with the ordinary lawn mower for the purpose of evenly distributing the cuttings from said lawn mower.

The common type of lawn mower now used has a cutter of cylindrical form, the same having a plurality of helical blades with their edges disposed substantially in a cylinder. When such a lawn mower is used to cut grass and no grass catcher is used, the helical formation of the cutter tends to throw the grass to one side of the mower so that the grass falls in noticeable windrows. When the grass dries, these windrows are rather unsightly and objectionable. Many people prefer to have the cut grass fall on the lawn and prefer not to use a grass catcher as the cuttings make good fertilizer and add springiness to the lawn.

It is an object of this invention to provide a simple and efficient device which can be easily attached to the lawn mower and detached therefrom for effecting an even distribution of the cuttings.

It is another object of the invention to provide such a device comprising a frame adapted to be attached to the lawn mower and drawn in the rear thereof close to the ground and comprising a frame on which are mounted a plurality of spaced members of sheet material disposed substantially in a vertical plane extending substantially perpendicular to the axis of the cutter of the mower.

It is a further object of the invention to provide such a device as set forth in the preceding paragraph, said members being formed of flexible sheet material and being of substantially triangular form and tapering toward their rear ends.

It is more specifically an object of the invention to provide a device adapted to be attached to the ordinary lawn mower and drawn along close to the ground in the rear thereof comprising a frame formed of small rods or wire having looped portions at its front adapted to hook over the brackets on a lawn mower which are used to attach the grass catcher, said frame having thereon a plurality of members of flexible sheet material disposed in substantially vertical planes spaced longitudinally of the cutter of said lawn mower, means being provided to support said frame from the bar of the lawn mower which extends from the handles to the cutter, said frame and members being collapsible into substantially one plane.

These and other objects and advantages of the invention will be fully set forth in the following description made in connection with the accompanying drawings in which like reference characters refer to similar parts throughout the several views and in which—

Fig. 1 is a view in side elevation of the device showing a portion of a lawn mower to which it is attached;

Fig. 2 is a perspective view of the device detached from the lawn mower;

Fig. 3 is a partial view in vertical section taken on line 3—3 of Fig. 2, as indicated by the arrows;

Fig. 4 is a perspective view of the frame used;

Fig. 5 is a perspective view of one end portion of said frame shown on an enlarged scale; and Fig. 6 is a perspective view of a modified form of support.

Referring to the drawings, a device is shown comprising a frame 10. While this frame could be variously formed, in the embodiment of the invention illustrated it is shown as made of a small rod or wire extending about three sides of a rectangle thus having a long side 10a and short and end sides 10b. Said frame has short vertical portions 10c at the ends of the long side 10a. At the free ends of the short sides 10b which are the front ends, said frame has portions 10d bent downwardly at a right angle and these portions are then bent into a loop 10e disposed in horizontal planes or in the general plane of frame 10. Said loops 10e extend away from the end portions 10b respectively. The portions 10e are adapted to hook over the upstanding arms 11a of brackets 11 ordinarily attached to the common lawn mower for receiving similar loops on a grass catcher. Another frame 12 is provided which is formed of a small rod or wire and extends about three sides of a rectangle, the same thus having a long side 12a and short or end sides 12b. The areas enclosed by the frames 10 and 12 are substantially equal. The free ends of the short sides 12b are pivotally connected at 12c adjacent the ends of the long side 10b. Frame 12 has small looped portions 12d projecting outward in the plane of said frame substantially a 45 degree angle. Extending between long side 12a and the long side 10a are a plurality of rods 13 having their ends bent around said sides respectively so as to be pivotally connected thereto. The end members 12b have bights or eyelets 12e bent upward substantially midway of their ends and a wire or rod 14 has its ends engaging said eyelets 12e and extending therebetween. Member 14 has narrow bight portions 14a formed therein and these are equal in number to and adapted to receive the wires or rods 13. The latter are thus held in spaced relation. Rod 14 also has an upwardly bent bight or eyelet 14b in which is pivotally engaged the lower end of a rod 15 having its upper end formed into a curved open loop 15a. Said loop 15a is adapted to extend over the bar 11b which extends from the cutter 11c or the wheels 11d of the lawn mower to the handles thereof. The lawn mower is also shown as having the usual roller 11e which engages the ground in the rear of the wheels 11d. A rod or wire 17 is connected adjacent the free ends of end portions 10b and extends therebetween. Secured to the end portions 12b and extending to the end portions 10b are members 18 of sheet material and in practice these have been made of flexible material, such as heavy muslin or canvas. Such sheets are preferably passed around end portions 12b and connected thereto by a seam and the same are connected to end portions 10b by small wire clips of fabric or string ties 16. Similar members 19 of sheet material which is of the same kind as used for members 18 are secured to the rods 13 at their upper edges. In practice the material has been bent around rods 13 and secured by a seam. Members 18 and 19 are connected to the long members 10a and 12a and are also connected to the member 17. While this connection could be made in various ways, in the embodiment of the invention illustrated the members 18 and 19 are provided adjacent their corners with eyelets 20. It will be seen from Figs. 1 and 2 that members 18 and 20 are substantially in the form of a right triangle. The short vertical side of this triangle is adjacent the lawn mower. The long vertical side is substantially parallel with the ground while the hypotenuse extends downwardly and rearwardly from the lawn mower. Members 18 and 19 thus taper in height at their rear ends. Clips 21 of wire or other suitable material extend respectively through the eyelets 20 and around the members 10a, 12a and 17, as shown in Fig. 2. Members 18 and 19 are thus kept taut when in operative position. Since portions 12b are pivotally connected to portion 10a and members 13 are also pivotally connected to portion 10a, the frames 10 and 12 can swing toward each other so as to come into substantially one plane. To hold these frames spaced when the device is in operative condition, a spacing member 22 is provided which is pivotally connected to portion 12a and is bent at its other end to provide a bight 22a which is engageable over the member 17. Member 22 holds the device in the position shown in Fig. 2 with the members 18 and 19 held nicely in vertical planes.

A third frame 24 is provided formed of a small rod or wire which extends about three sides of an elongated rectangle and has its free ends bent around and pivotally connected to portion 12a adjacent the ends of the latter. Frame 24 has loops 24a projecting at the corners thereof, which loops project outwardly substantially at an angle of 45 degrees. Said frame is swingable on portion 12a and said loops form convenient handles for swinging the same. Carried on frame 24 is a member 25 of sheet material which has its edges folded over the sides of frame 24 and secured by seams. Frame 24 and its attached member 25 can be swung to the position shown in Fig. 2 where it lies on top of members 13 and portions 12b and it can be swung to the vertical position shown in Fig. 4 or it can be swung to extend downwardly along the front of members 18 and 19 in vertical position.

Some lawn mowers have spaced bars 11h, as shown in Fig. 6, which extend from the wheels to the handle. In Fig. 6 is shown a support comprising a pair of members 28 each having at one end a curved open loop 28a adapted to engage over the bars 11h of the lawn mower. Each member 28 has an eyelet 28b at its end through which the other member 28 passes. Members 28 can thus be moved relatively longitudinally of each other to vary the spacing of portions 28a to suit different spacings of members 11h. A U-shaped clip 29 has its ends bent around and loosely engaging members 28. Member 29 will be connected to the upper end of a rod 30 which will be connected to member 14 just as is member 15.

In operation the device is attached to a lawn mower, as shown in Fig. 1, with the loop 15a extending over bar 11b. Loops 10e are engaged over the brackets 11a. The device is placed in operative position with member 22 holding portion 12a spaced from member 17. As the lawn mower is now pushed along to cut the grass the cuttings or clippings are thrown rearwardly by the cutter and they pass between and engage the sides of members 18 and 19. The lateral direction of travel or flight of the cuttings is thus arrested and a group of cuttings can only travel substantially the distance between members 18 and 19. The cuttings or clippings are thus caused to fall in a substantially uniform layer on the lawn. The objectionable forming of windrows is thus eliminated. When a lawn mower having spaced bars 11h is used, the support shown in Fig. 6 can be used. When the device is not to be used, it can be quickly detached from the lawn mower by one lifting motion and can be collapsed into substantially one plane by detaching member 22 from rod 17. Frames 10 and 12 then move into substantially one plane and the flexible members 19 and 20 fold into substantially the same plane. When unusually tall or long grass is cut, frame 24 and its member 25 are swung to the position shown in Fig. 2. This frame prevents the cuttings or clippings from being thrown over the members 18 and 19. Such travel of clippings would occur practically altogether at the front of members 18 and 19 and it will be arrested by member 25. Frame 24 and member 25 can also be swung to the dotted line position in Fig. 1 in front of members 18 and 19. They will then act to prevent the clippings from being thrown too far.

From the above description it will be seen that I have provided a simple yet very efficient device for causing a uniform distribution and deposit of the grass cuttings or clippings on the lawn. The device can be readily and easily made from simple material so that it will be inexpensive. It can be almost instantly attached to and detached from the lawn mower. When not in use it can be placed in collapsed position and will require little space for storage. The device has been amply demonstrated in actual practice and found to be very successful and efficient.

It will of course be understood that various changes may be made in the form, details, arrangement and proportions of the parts, without departing from the scope of applicant's invention, which generally stated, consists in a

What is claimed is:

1. A device of the class described having in combination, a frame adapted to be connected to a lawn mower, which mower has a rotatable cutter, a pair of end members and a plurality of spaced members disposed therebetween, said members being of sheet material carried by said frame and disposed in a plane substantially perpendicular to the axis of said cutter, the spaces between said members being unobstructed at their upper ends and said members being arranged to be engaged by the cuttings of grass from said cutter for causing a substantially uniform distribution of the cuttings transversely of said cutter.

2. The structure set forth in claim 1, said frame having a member extending substantially horizontally at the front end thereof, and a third frame having a piece of sheet material secured longitudinally thereacross said third frame being swingably connected to said last mentioned member and adapted to be disposed in a substantially vertical position at the front of said frame.

3. A device of the class described adapted to be attached to a lawn mower which mower has a cutter with a helical blade having in combination, a frame adapted to be attached to said mower and disposed in the rear of said cutter with the bottom of said frame close to the ground, a pair of end members and a plurality of members spaced therebetween, said members being of sheet material and disposed in substantially vertical planes carried on said frame for causing a substantially uniform distribution of the grass cuttings transversely of said cutter and the spaces between said spaced members being unobstructed at their upper ends.

4. A device of the class described having in combination with a lawn mower having a cutter with a helical blade disposed substantially in the surface of a cylinder, a frame adapted to be attached to said mower and disposed in the rear of said cutter with the bottom of said frame close to the ground, a pair of end members and a plurality of members spaced therebetween, said members being made of sheet material and disposed in substantially vertical planes, said members being of general triangular form and tapering toward their rear ends and the spaces between said spaced members being unobstructed at their upper ends.

5. A device of the class described adapted to be attached to a lawn mower which mower has a cutter with a helical blade having in combination, a frame adapted to be attached to said mower and disposed in the rear of said cutter with the bottom of said frame close to the ground, a pair of end members and a plurality of members spaced therebetween, said members being made of sheet material and disposed in substantially vertical planes, said members being of flexible material and said frame being collapsible with said members into substantially one plane and the spaces between said spaced members being unobstructed at their upper ends.

6. A device of the class described having in combination with a lawn mower having a cylindrical type cutter with a helical blade, a frame formed of a small rod or wire and of general rectangular form, members at the corners of one long side of said frame of loop formation adapted to engage over brackets on said lawn mower, a plurality of spaced rods pivotally mounted to the other long side of said frame, a wire or rod connected to the other ends of said rods, a second rod pivotally connected to said last mentioned wire or rod and engageable with said first mentioned long side of said frame, a plurality of members of flexible sheet material secured to said wires or rods and to said frame, said members being substantially of right triangular form and disposed in substantially vertical planes, said plurality of wires or rods, said last mentioned rod and said members being swingable substantially into the plane of said frame when said second mentioned rod is released from said frame.

7. A device of the class described having in combination with a lawn mower having a cylindrical type cutter with a helical blade, a frame formed of a small rod or wire and forming three sides of a rectangle, members at the ends of the short sides of said frame of loop formation adapted to engage over brackets on said lawn mower, a second frame formed of a small rod or wire and forming three sides of a rectangle pivotally connected at the free ends of its short sides to the long side of said first mentioned frame whereby said frames can swing into substantially one plane, a spacing member secured to one of said frames and detachably connected to the other for holding said frames spaced and in planes at an angle to each other, and a plurality of spaced members of flexible sheet material secured to and extending between said frames in substantially vertical planes adapted to be engaged by the cuttings from said lawn mower to evenly distribute the same.

8. The structure set forth in claim 7, and a frame of substantially rectangular form swingably connected to the long side of said second frame, the same having a piece of sheet material extending thereover.

9. A device of the class described having in combination with a lawn mower having a cylindrical type cutter with a helical blade, a frame formed of a small rod or wire and extending about three sides of a rectangle, the same having formed at the ends of its short sides loop portions adapted to engage over brackets on said lawn mower, a second frame formed of a small rod or wire and extending about three sides of a rectangle, the same being pivotally connected at the free ends of its short sides adjacent the ends of the long side of said first mentioned frame whereby said frames can swing into substantially the same plane or be disposed in diverging planes, a spacing member secured to one of said frames and detachably engaging the other to hold said frame spaced and in diverging planes, a plurality of rods or wires extending between the long sides of said frames and pivotally connected to said sides and disposed at right angles to said sides, a plurality of members of flexible sheet material secured to said last mentioned members and to the short sides of said second frame and extending between said frames, the same being adapted to be engaged by the cuttings of said cutter to uniformly distribute the same.

10. The structure set forth in claim 9, a third wire or rod secured to the short sides of said second mentioned frame substantially midway between the ends thereof and extending therebetween, the same having bights formed therein for respectively receiving said rods extending between the long sides of said frame.

11. The structure set forth in claim 9, a third wire or rod secured to the short sides of said second mentioned frame substantially midway between the ends thereof and extending therebetween, the same having bights formed therein for respectively receiving said rods extending between the long sides of said frame, and a member secured to said third rod having a looped end adapted to extend over the bar of said lawn mower extending from the handles to the cutter thereof.

12. A device of the class described having in combination, a frame adapted to be connected to a lawn mower, which mower has a rotatable cutter, a multiplicity of spaced members carried by said frame and disposed in substantially vertical planes in the rear of said cutter and the spaces between said spaced members being unobstructed at their upper ends for the greater part of the length of said members, and a member of sheet material swingably connected to the upper front portion of said frame and adapted to overlie the front end portions of said members or be disposed in a vertical plane at the front of said members.

13. A device of the class described having in combination, a frame adapted to be connected to a lawn mower, which mower has a rotatable cutter, a pair of end members, a multiplicity of spaced members spaced therebetween, said members being carried by said frame and disposed in substantially vertical planes in the rear of said cutter and the spaces between said last mentioned members being unobstructed at their upper ends, and a member of sheet material carried on said frame and disposed in front of said members at the upper portions thereof.

14. A device of the class described having in combination, a frame adapted to be connected to a lawn mower, which mower has a rotatable cutter, a pair of end members, a multiplicity of members spaced therebetween, said members being carried by said frame and disposed in substantially vertical planes in the rear of said cutter and the spaces between said last mentioned members being unobstructed at their upper ends for the greater part of the length of said members, and a member of sheet material carried by said frame and disposable over said members at the front ends thereof.

15. A device constructed and arranged to be attached to a lawn mower, which mower has a cutter comprising a helical blade having in combination, a series of transversely extending members of sheet material disposed in substantially vertical substantially parallel planes extending substantially at right angles to the axis of said cutter, said members being substantially equally spaced and their front ends being disposed some distance in the rear of said cutter, the spaces between said members at their upper ends being unobstructed for the greater portion of their length.

ARTHUR A. GABRIELSON.

REFERENCES CITED

The following references are of record in the file of this patent:

UNITED STATES PATENTS

| Number | Name | Date |
| --- | --- | --- |
| 404,690 | Deland | June 4, 1889 |
| 1,591,123 | Geringer | July 6, 1926 |
| 2,517,184 | Elliott et al. | Aug. 1, 1950 |